United States Patent
Platner et al.

(12) 
(10) Patent No.: US 6,234,492 B1
(45) Date of Patent: May 22, 2001

(54) METHOD AND SYSTEM FOR PROVIDING VARIABLE LOAD CONTROL AND ISOLATION IN A VEHICLE SUSPENSION

(75) Inventors: David K. Platner, Shelby; Kurt A. Burmeister, Rochester Hills; Ragnar Ledesma, Sterling Heights; Steven R. Miller, Clarkston; Mark P. Reynolds, Birmingham; Monte G. Williams, Royal Oak, all of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/419,159

(22) Filed: Oct. 15, 1999

(51) Int. Cl.⁷ ................................................ B60G 17/02
(52) U.S. Cl. ......................................................... 280/5.515
(58) Field of Search ............................... 280/5.504, 5.505, 280/5.506, 5.515, 5.516, 5.517, 5.518, 5.519

(56) References Cited

U.S. PATENT DOCUMENTS 4,900,054   2/1990  Kessler .
5,390,949 * 2/1995  Naganathan et al. ............. 280/5.515
5,609,353 * 3/1997  Watson .............................. 280/5.516

FOREIGN PATENT DOCUMENTS 0133589   8/1984  (EP) .
0563845   3/1993  (EP) .

* cited by examiner

*Primary Examiner*—Kenneth R. Rice
(74) *Attorney, Agent, or Firm*—Carlson, Gaskey & Olds, P.C.

(57) ABSTRACT

A method and system for providing variable load control and isolation in a vehicle suspension includes a variably flexible suspension element coupled between the frame of the vehicle and the wheel. The variably flexible suspension element comprises an electrically responsive material disposed therein that varies stiffness in response to electrical control signals applied thereto. The electrical control signals are generated by an electronic control unit and are representative of road conditions traveled by the vehicle as sensed by at least one sensor.

20 Claims, 1 Drawing Sheet

METHOD AND SYSTEM FOR PROVIDING VARIABLE LOAD CONTROL AND ISOLATION IN A VEHICLE SUSPENSION

BACKGROUND OF THE INVENTION

This invention relates to methods and systems for providing variable load control and isolation in a vehicle suspension.

The suspension of a vehicle allows it to drive smoothly over a bumpy road. The wheels may jolt up and down, but springs between the wheel axles and the body of the car flex and take up the force of the jolts. This ensures that the force of the bumping is not transferred to the vehicle. Springs alone produce a bouncing motion, so the suspension also contains dampers, commonly known as shock absorbers. These slow the movement of the springs to prevent the vehicle and its occupants bouncing up and down.

Current suspension elements, such as the front axle member, springs and dampers, are composed of materials and/or substances that provide a singular response to load inputs. It is desirable, however, to provide a suspension element that addresses changes in stiffness to effect the desired response of the suspension system.

SUMMARY OF THE INVENTION

A method and system for providing variable load control and isolation in a vehicle suspension is provided. At least one sensor senses the road conditions traveled by, or to be traveled by, the vehicle and generates corresponding road condition signals. An electronic control unit is coupled to the sensor, or sensors, for receiving the signals representative of the road conditions and generating corresponding electrical control signals for varying the stiffness of the suspension.

A variably flexible suspension element is coupled between the frame of the vehicle and the wheel and has an electrically responsive material disposed therein that varies stiffness in response to electrical signals applied thereto by the electronic control unit. The electrical control signals may be transmitted through the variably flexible suspension element via a plurality of electrodes dispersed therethrough.

The variably flexible suspension element preferably comprises at least two different layers of electrically responsive materials. As examples, these layers of materials may be any combination of rheological, crystalline, or piezoelectric materials. Other appropriate materials may be used.

These and other features of the present invention can be understood from the following specification and drawings.

DETAILED DESCRIPTION OF A PREFERRED EMBODIMENT

Figure 1:
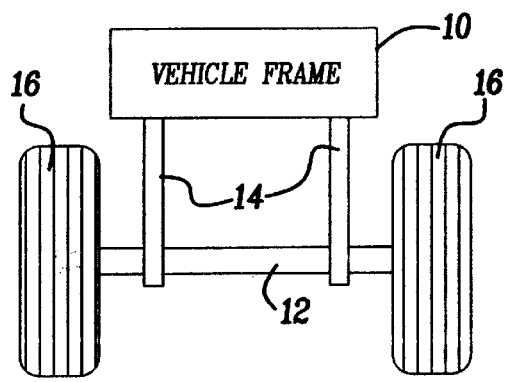
FIG. 1 is a schematic plan view of a vehicle suspension suitable for the method and system of the present invention.

FIG. 1 shows a schematic plan view of a typical vehicle suspension system suitable for the method and system of the present invention. The suspension system typically includes a vehicle frame 10 coupled to a rigid axle 12 via suspension elements 14. The axle 12 is coupled to a pair of wheels 16 and move the wheels 16 in an up and down fashion according to the movement of the suspension elements 14.

Figure 2:
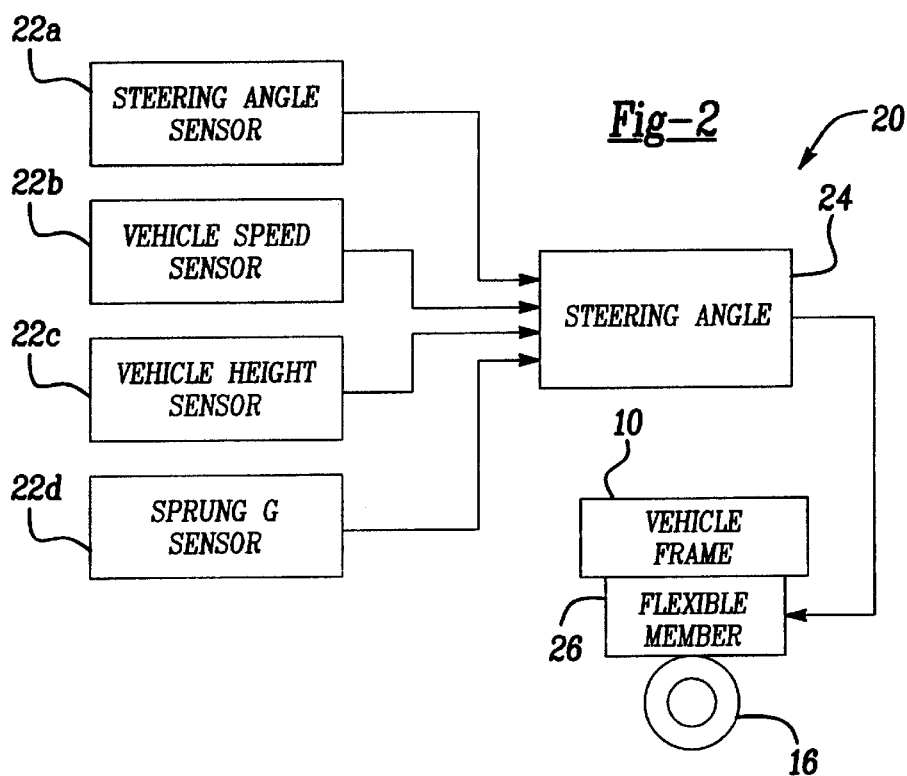
FIG. 2 is a schematic diagram of the system of the present invention.

FIG. 2 is a schematic diagram of the system of the present invention, denoted generally by reference numeral 20, for use with the suspension system. The system 20 includes a plurality of sensors 22 for sensing road conditions traveled by, or to be traveled by, the vehicle. For example, the sensors 22 may include a steering angle sensor 22a for sensing the steering angle of the vehicle and a vehicle speed sensor 22b for sensing the running speed of the vehicle. Furthermore, the sensors 22 may include a vehicle height sensor 22c for sensing the stroke of the wheels 16 relative to the vehicle frame 10. A sprung G sensor 22d may also be included for sensing the vertical acceleration acting on the frame 10 of the vehicle. The number and type of sensors 22 to be used with the present invention is not limited to those discussed above, nor does the invention necessarily use all of these disclosed sensors.

Each of the signals generated by the sensors 22 are transmitted to an electronic control unit 24 having control logic programmed therein for processing the signals and generating corresponding control signals. These signals are transmitted to a variably flexible member 26 mounted between the vehicle frame 10 and the wheels 16 and taking the place of the rigid axle 12 or even the suspension elements 14.

Figure 3:
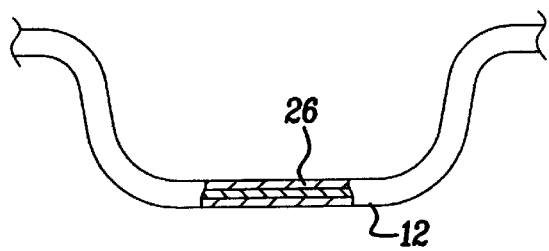
FIG. 3 is a cross section of a rigid beam axle incorporating the suspension element of the present invention.

The variably flexible member has an electrically responsive material disposed therein that varies stiffness in response to electrical signals applied thereto. As shown in FIG. 3, the variably flexible member 26 may be made part of the rigid axle 12. Although not shown, the variably flexible member 26 may form the entire axle 12 rather than just a portion of it. Preferably, the variably flexible member 26 comprises at least two layers of different electrically responsive materials. These materials may include, for example, any combination of a Theological, crystalline, or piezoelectric material. Each of these materials change shape, i.e., stiffness, in the presence of electrical signals. As mentioned above, the inventive layers may also be utilized to replace suspension members 14.

Figure 4:
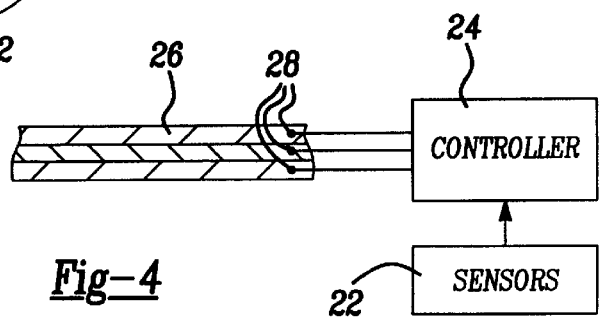
FIG. 4 is a schematic diagram of the variably flexible suspension element of the present invention.

As shown in FIG. 4, electrodes 28 may be dispersed in each of the electrically responsive layers to facilitate transmission of the electrical control signals transmitted by the electronic control unit 24.

Preferred embodiments have been disclosed. However, a worker skilled in this art would recognize that modifications would come within the scope of this invention. Thus, the following claims should be studied to determine the scope and content of this invention.

What is claimed is:

1. A method for providing variable load control and isolation in a vehicle suspension, the vehicle having a frame and a wheel, the method comprising:

providing a variably flexible member coupled between the frame of the vehicle and the wheel and having at least two different layers of an electrically responsive material disposed therein that varies stiffness in response to electrical signals applied thereto, the electrical signals representative of road conditions traveled by the vehicle.

2. The method as recited in claim 1 further comprising:

sensing the road conditions traveled by the vehicle; and generating the electrical signals for receipt by the variably flexible member based on the sensed road conditions.

3. The method as recited in claim 2 further comprising transmitting the electrical signals through the variably flexible member.

4. The method as recited in claim 1 wherein providing the variably flexible member further comprises providing at least two different layers of electrically responsive materials, wherein each of the at least two different layers each are of a different electrically responsive material.

5. The method as recited in claim 1 where the electrically responsive materials include rheological materials.

6. The method as recited in claim 1 where the electrically responsive materials include crystalline materials.

7. The method as recited in claim 1 where the electrically responsive materials include piezoelectric materials.

8. A suspension element for providing variable load control and isolation in a vehicle suspension, the vehicle having a frame and a wheel, the element comprising:

a variably flexible member coupled between the frame of the vehicle and the wheel and having at least two different layers of an electrically responsive material disposed therein that varies stiffness in response to electrical signals applied thereto, the electrical signals being varied responsive to road conditions traveled by the vehicle.

9. The suspension element as recited in claim 8 wherein the vehicle further includes at least one sensor for sensing the road conditions and an electronic control unit, coupled to the sensor, for generating the electrical signals for receipt by the variably flexible member and wherein the variably flexible member further comprises interconnections for receiving the electrical signals from the electronic control unit.

10. The suspension element as recited in claim 9 wherein the interconnections comprise a plurality of electrodes dispersed therein and coupled to the electronic control unit for transmitting the electrical signals through the variably flexible member.

11. The suspension element as recited in claim 8 wherein the variably flexible member comprises at least two different layers of electrically responsive materials, wherein each of the at least two different layers each are of a different electrically responsive material.

12. The suspension element as recited in claim 11 wherein the at least two different layers of electrically responsive materials include rheological materials and piezoelectric materials.

13. The suspension element as recited in claim 8 where the electrically responsive materials include crystalline materials.

14. The suspension element as recited in claim 8 where the electrically responsive materials include piezoelectric materials.

15. The suspension element as recited in claim 8 where the electrically responsive materials include rheological materials.

16. A system for providing variable load control and isolation in a vehicle suspension, the vehicle having a frame and a wheel, the system comprising:

at least one sensor for sensing road conditions traveled by the vehicle and generating at least one road condition signal;

an electronic control unit coupled to the at least one sensor for receiving the at least one road conditions signal and generating electrical control signals in response thereto; and a variably flexible member coupled between the frame of the vehicle and the wheel and to the electronic control unit, the variably flexible member having at least two different layers of an electrically responsive material disposed therein that varies stiffness of the flexible member in response to the electrical control signals applied thereto.

17. The system as recited in claim 16 further comprising a plurality of electrodes dispersed in the variably flexible member and coupled to the electronic control unit for transmitting the electrical control signals through the variably flexible member.

18. The system as recited in claim 16 where the electrically responsive materials include rheological materials.

19. The system as recited in claim 16 where the electrically responsive materials include crystalline materials.

20. The system as recited in claim 16 where the electrically responsive materials include piezoelectric materials.

* * * * *